(12) United States Patent
Block et al.

(10) Patent No.: US 12,434,811 B2
(45) Date of Patent: Oct. 7, 2025

(54) FLAP SUPPORT SYSTEMS AND METHODS FOR A WING OF AN AIRCRAFT

(71) Applicant: THE BOEING COMPANY, Arlington, VA (US)

(72) Inventors: Samuel Block, Bothell, WA (US); Ryan Joseph Cazin, Lynnwood, WA (US); Kevin Tsai, Redmond, WA (US)

(73) Assignee: The Boeing Company, Arlington, VA (US)

( * ) Notice: Subject to any disclaimer, the term of this patent is extended or adjusted under 35 U.S.C. 154(b) by 49 days.

(21) Appl. No.: 18/364,652

(22) Filed: Aug. 3, 2023

(65) Prior Publication Data
US 2025/0042535 A1 Feb. 6, 2025

(51) Int. Cl.
*B64C 9/02* (2006.01)
*B64C 9/18* (2006.01)

(52) U.S. Cl.
CPC . *B64C 9/02* (2013.01); *B64C 9/18* (2013.01)

(58) Field of Classification Search
CPC .... B64C 5/10; B64C 5/08; B64C 3/50; B64C 9/18; B64C 9/02
See application file for complete search history.

(56) References Cited

U.S. PATENT DOCUMENTS

| | | | | |
|---|---|---|---|---|
| 4,283,029 A * | 8/1981 | Rudolph | ............. | B64C 9/18 244/215 |
| 4,605,187 A * | 8/1986 | Stephenson | ............. | B64C 9/04 244/216 |
| 4,669,687 A * | 6/1987 | Rudolph | ............. | B64C 9/18 244/215 |
| 4,763,862 A * | 8/1988 | Steinhauer | ............. | B64C 9/18 244/215 |
| 4,840,331 A * | 6/1989 | Williams | ............. | B64C 9/16 244/212 |
| 6,076,775 A * | 6/2000 | Bauer | ............. | B64C 9/18 244/215 |
| 10,926,864 B2 | 2/2021 | Tsai | | |
| 2010/0065689 A1 * | 3/2010 | Goettinger | ............. | B29C 70/48 244/131 |
| 2015/0083854 A1 * | 3/2015 | Ferreira | ............. | B64C 9/16 244/99.3 |
| 2018/0290726 A1 * | 10/2018 | Sun | ............. | F16F 7/121 |
| 2020/0391845 A1 * | 12/2020 | Tsai | ............. | B64C 9/18 |
| 2020/0407041 A1 * | 12/2020 | Tsai | ............. | B64C 7/00 |
| 2021/0061442 A1 * | 3/2021 | Tsai | ............. | B64C 9/02 |
| 2021/0061443 A1 * | 3/2021 | Dahl | ............. | B64C 9/04 |
| 2021/0078694 A1 * | 3/2021 | Tsai | ............. | B64C 9/20 |
| 2022/0185449 A1 * | 6/2022 | Glassmoyer | ............. | B64C 9/16 |
| 2023/0159183 A1 | 5/2023 | Block | | |
| 2023/0271696 A1 * | 8/2023 | Andreani | ............. | B64C 9/16 244/99.3 |

* cited by examiner

*Primary Examiner* — William L Gmoser

(74) *Attorney, Agent, or Firm* — Joseph M. Butscher; The Small Patent Law Group LLC

(57) ABSTRACT

A system and a method include a crank pivotally coupled to a bracket of a main body of a wing of an aircraft. A drive link is pivotally coupled to the crank. A flap link is pivotally coupled to a carrier beam extending from a flap moveably coupled to the main body of the wing. A rocker bracket is pivotally coupled to the flap link and the drive link.

20 Claims, 7 Drawing Sheets

FLAP SUPPORT SYSTEMS AND METHODS FOR A WING OF AN AIRCRAFT

FIELD OF THE DISCLOSURE

Examples of the present disclosure generally relate to systems and methods for supporting a flap of a wing of an aircraft.

BACKGROUND OF THE DISCLOSURE

A typical airplane includes wings having control surfaces, such as flaps. For example, a wing includes a flap that is moveably connected to a main body.

A flap is typically coupled to a plurality of supports, such as main supports and optionally an auxiliary support between two main supports. The main supports include actuators that are configured to drive motion of the flap between retracted and extended positions.

The flap is secured to a main body of a wing by a flap support mechanism. A known flap support mechanisms utilizes a kinematic over-center position only once during deployment of the flap. It has been found that total loads exerted into an actuator that drives flap motion are relatively high.

SUMMARY OF THE DISCLOSURE

A need exists for a system and a method for supporting a flap in relation to a wing that reduce actuation loads. With that need in mind, certain examples of the present disclosure provide a system including a crank pivotally coupled to a bracket of a main body of a wing of an aircraft. A drive link is pivotally coupled to the crank. A flap link is pivotally coupled to a carrier beam extending from a flap moveably coupled to the main body of the wing. A rocker bracket is pivotally coupled to the flap link and the drive link.

In at least one example, the flap link pivotally connects to the carrier beam at a first pivotal connection. The rocker bracket pivotally connects to the flap link at a second pivotal connection. The rocker bracket pivotally connects to the drive link at a third pivotal connection. The rocker bracket pivotally connects to the main body of the wing at a fourth pivotal connection.

In at least one example, the system provides a first over-center condition when the flap is in a stowed position, and a second over-center condition when the flap is in a fully deployed position. In at least one example, the first pivotal connection, the second pivotal connection, and the fourth pivotal connection are disposed along a first line to provide the first over-center condition.

In at least one example, the crank pivotally connects to the bracket at a fifth pivotal connection. The crank pivotally connects to the drive link at a sixth pivotal connection. In at least one example, the fifth pivotal connection, the sixth pivotal connection, and the third pivotal connection are disposed along a second line to provide the second over-center condition.

The crank can be coupled to a carriage that is configured to be moved in relation to a shaft.

In at least one example, the rocker bracket is aft from the crank.

In at least one example, the rocker bracket can have a triangular shape.

Certain examples of the present disclosure provide an aircraft including a fuselage, and wings extending from the fuselage. The wings include a main body, and a flap moveably coupled to the main body. A system, as described herein, moveably secures the flap to the main body.

Certain examples of the present disclosure provide a method including pivotally coupling a crank to a bracket of a main body of a wing of an aircraft; pivotally coupling a drive link to the crank; pivotally coupling a flap link to a carrier beam extending from a flap moveably coupled to the main body of the wing; and pivotally coupling a rocker bracket pivotally to the flap link and the drive link.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods that reduce loads on flap actuators. In contrast to prior known mechanisms, examples of the present disclosure provide two over-center positions, thereby improving kinematics, and reducing actuation loads. In particular, the systems and methods provide an over-center position when the flap is in a stowed position, and another over-center position when the flap is in a deployed position, thereby substantially reducing actuation loads at the different positions. The systems described herein direct external load more directly into fixed wing structure rather than an actuator.

Figure 1:
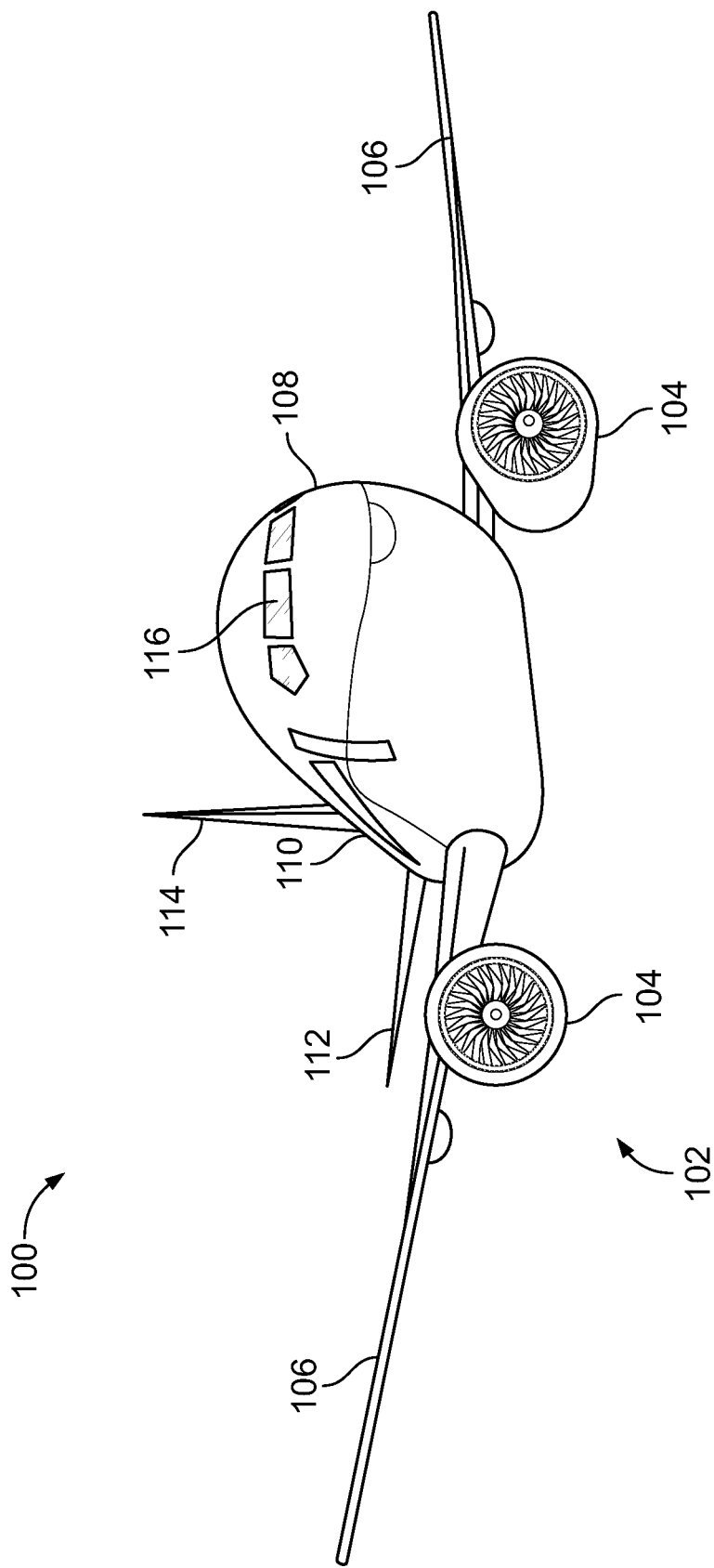
FIG. 1 illustrates a perspective front view of an aircraft, according to an example of the present disclosure.

FIG. 1 illustrates a front perspective view of an aircraft 100, according to an example of the present disclosure. The aircraft 100 includes a propulsion system 102 that can include two engines 104, for example. Optionally, the propulsion system 102 can include more engines 104 than shown. The engines 104 can be carried by wings 106 of the aircraft 100. In other examples, the engines 104 may be carried by a fuselage 108 and/or an empennage 110. The empennage 110 may also support horizontal stabilizers 112 and a vertical stabilizer 114. The fuselage 108 of the aircraft 100 defines an internal cabin 116, which may include a flight deck or cockpit, one or more work sections (for example, galleys, personnel carry-on baggage areas, and the like), one or more passenger sections (for example, first class, business class, and coach sections), and/or the like.

Figure 2:
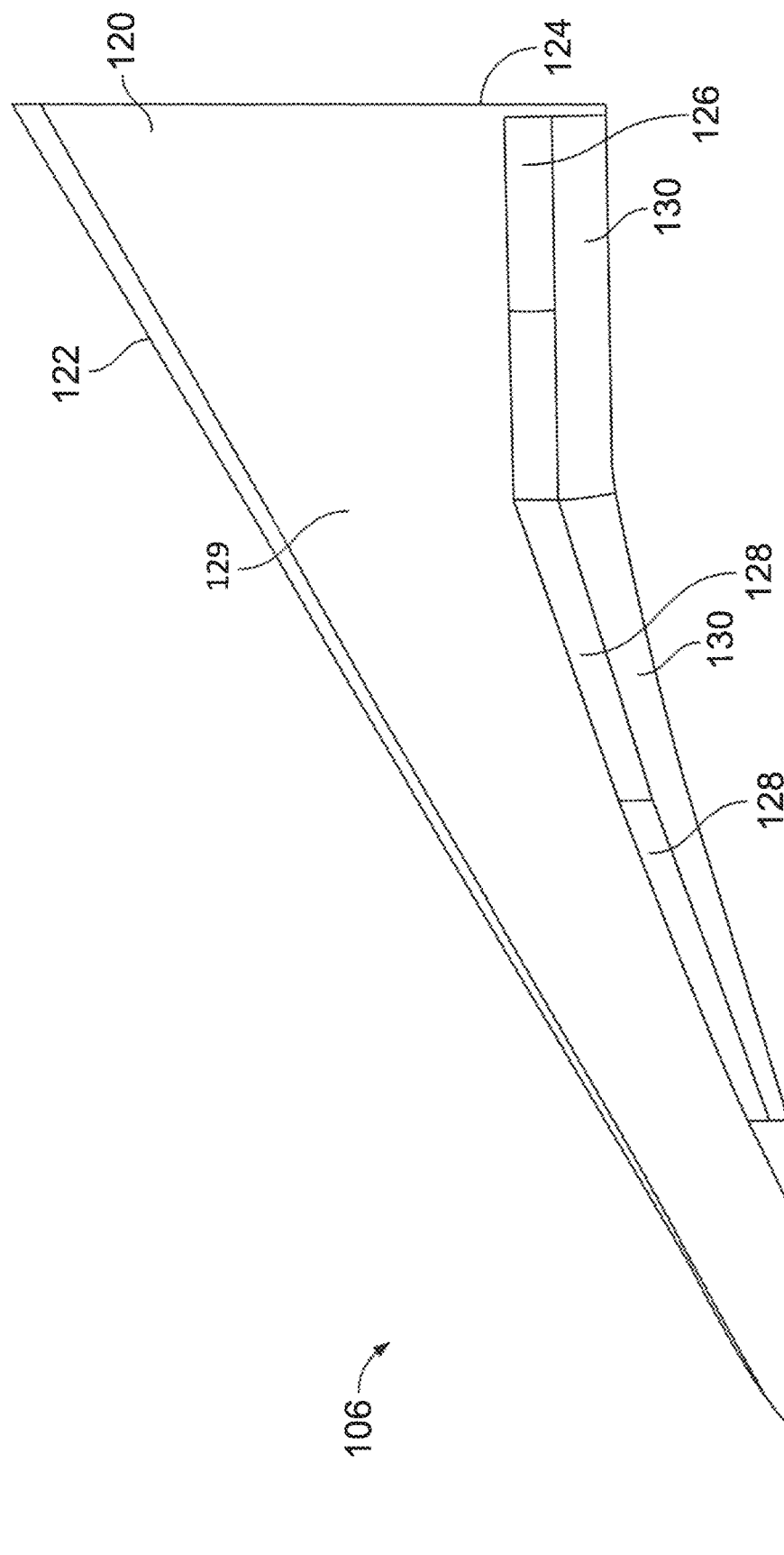
FIG. 2 illustrates a top plan view of a wing, according to an example of the present disclosure.

FIG. 2 illustrates a top plan view of a wing 106, according to an example of the present disclosure. The wing 106 includes a main body 120 having a leading rounded edge 122 and a trailing edge 124. One or more droop panels 126 can extend from the trailing edge 124. The droop panel(s) 126 may be inboard (that is, closer to the fuselage 108 shown in FIG. 1) from spoilers 128, which are configured to be downwardly moved below a plane of an upper surface 129 of the wing 106, and upwardly moved above the plane of the upper surface 129 of the wing 106. In contrast, the droop panel(s) 124 may be configured to only be moved below (and may be moved slightly above) the plane of the upper surface 129 of the wing 106. Optionally, the droop panel(s) 124 may be anywhere above one or more of flaps 130. Alternatively, the wing 106 may not include a droop panel.

Flaps 130 are positioned behind (that is, toward the aft of the aircraft 100 shown in FIG. 1) the droop panel(s) 124 and the spoilers 128. At least a portion of a flap 130 can be positioned underneath the droop panel 126.

Figure 3:
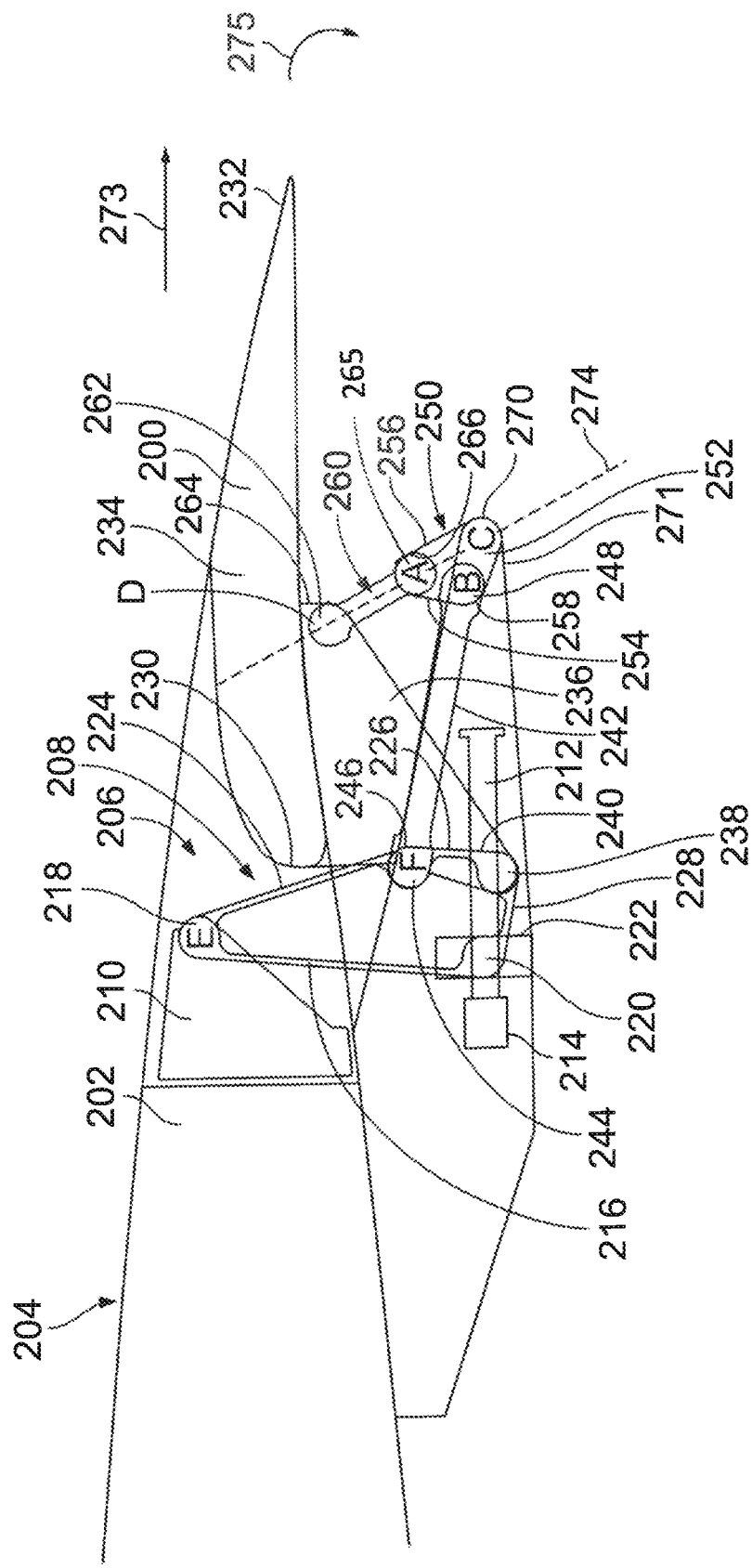
FIG. 3 illustrates a lateral view of a flap in a stowed position, according to an example of the present disclosure.

FIG. 3 illustrates a lateral view of a flap 200 in a stowed position, according to an example of the present disclosure. The flap 200 is moveably coupled to a main body 202 of a wing 204 by a flap support system 206. The flap support system 206 includes a crank 208 coupled to a bracket 210 of the main body 202 and a shaft 212 that is coupled to an actuator 214, which is secured to a portion of the main body 202. The crank 208 includes an extension beam 216 having a first end 218 pivotally coupled to the bracket 210 such as through a pinned connection. The extension beam 216 includes a second end 220 coupled to a carriage 222 that is configured to ride along the shaft 212. The first end 218 of the extension beam 216 also connects to an angled beam 224 that extends to a link beam 226 that is parallel to the extension beam 216. The link beam 226 connects to an end beam 228 that connects to the second end 220 of the extension beam 216.

In at least one example, the actuator 214 is a ball screw actuator. As another example, the actuator 214 can be a linear hydraulic actuator. As another example, the actuator 214 can be a rotary actuator. As another example, the actuator 214 can be an electric motor.

The flap 200 includes a rounded leading end 230 that connects to a tapered trailing end 232 by an intermediate body 234. A carrier beam 236 extends downwardly and forwardly from the flap 200. The carrier beam 236 includes a forward apex 238 that pivotally connects to an aft end 240 of the link beam 226 of the crank 208.

A crank-coupling drive link 242 provides a linear beam having a first end 244 pivotally coupled to an end 246 of the angled beam 224 that is distal from the first 218 of the extension beam 216. The drive link 242 includes a second end 248 that is pivotally coupled to a triangular rocker bracket 250. The rocker bracket 250 is aft from the crank 208. As shown, in the stowed position, the rocker bracket 250 is behind the crank 208, and may not be below the end beam 228 of the crank 208 when the flap 200 is in the stowed position.

The rocker bracket 250 includes a lower edge 252 connected to a leading edge 254, and an angled trailing edge 256, thereby providing a triangular shape. The second end 248 of the drive link 242 is pivotally coupled to a front lower coupling 258 of the rocker bracket 250. The front lower coupling 258 is at a junction of the lower edge 252 and the leading edge 254. Optionally, the rocket bracket 250 may have a different shape. For example, the rocker bracket 250 can include three different points, which may be within a shape that may or may not be triangular.

A flap link 260 provides a linear beam having a first end 262 pivotally coupled to an upper aft portion 264 of the carrier beam 236 extending below the flap 200. The flap link 260 includes a second end 265 pivotally coupled to a front upper coupling 266 of the rocker bracket 250. The front upper coupling 266 of the rocker bracket 250 is a junction of the leading edge 254 and the angled trailing edge 256.

The rocker bracket 250 pivotally connects to the flap link 260 at point A, which is a pinned pivotal connection. The rocker bracket 250 pivotally connects to the drive link 242 at point B, which is a pinned pivotal connection. A trailing apex 270 of the rocker bracket 250 provides point C, which pivotally connects the rocker bracket 250 to a trailing lower end 271 of the main body 202.

The first end 262 of the flap link 260 pivotally connects to the carrier beam 236 at point D. As shown, in the stowed position, points D-A-C are disposed along a line 274 that provides an over-center condition. External load generally passes into the main body 202 of the wing through the line 274, rather than into the actuator 214.

Fowler is rearward translation 273 of the flap 200, and flap angle is rotation 275 of the flap 200 relative to the stowed position. High fowler flaps involve greater rearward motion prior to flap rotation increase. Higher fowler values with less initial rotation can be aerodynamically beneficial during takeoff. It has been found that the arrangement of the system 100 as shown and described increases fowler values during takeoff and landing of an aircraft.

As shown, the flap support system 206 includes the crank 208 pivotally coupled to the bracket 210 (at point E) of the main body 202 of the wing 204. The drive link 242 is pivotally coupled to the crank 208 (at point F). The flap link 260 is pivotally coupled to the carrier beam 236 (at point D) extending from the flap 200. The rocker bracket 250 is pivotally coupled to the flap link 260 (at point A) and the drive link 242 (at point B). The flap link 260 pivotally connects to the carrier beam 236 at a first pivotal connection (for example, point D). The rocker bracket 250 pivotally connects to the flap link 260 at a second pivotal connection (for example, point A). The rocker bracket 250 pivotally connects to the drive link 242 at a third pivotal connection (for example, point B). The rocker bracket 250 pivotally connects to the main body 202 of the wing 204 at a fourth pivotal connection (for example, point C).

Figure 4:
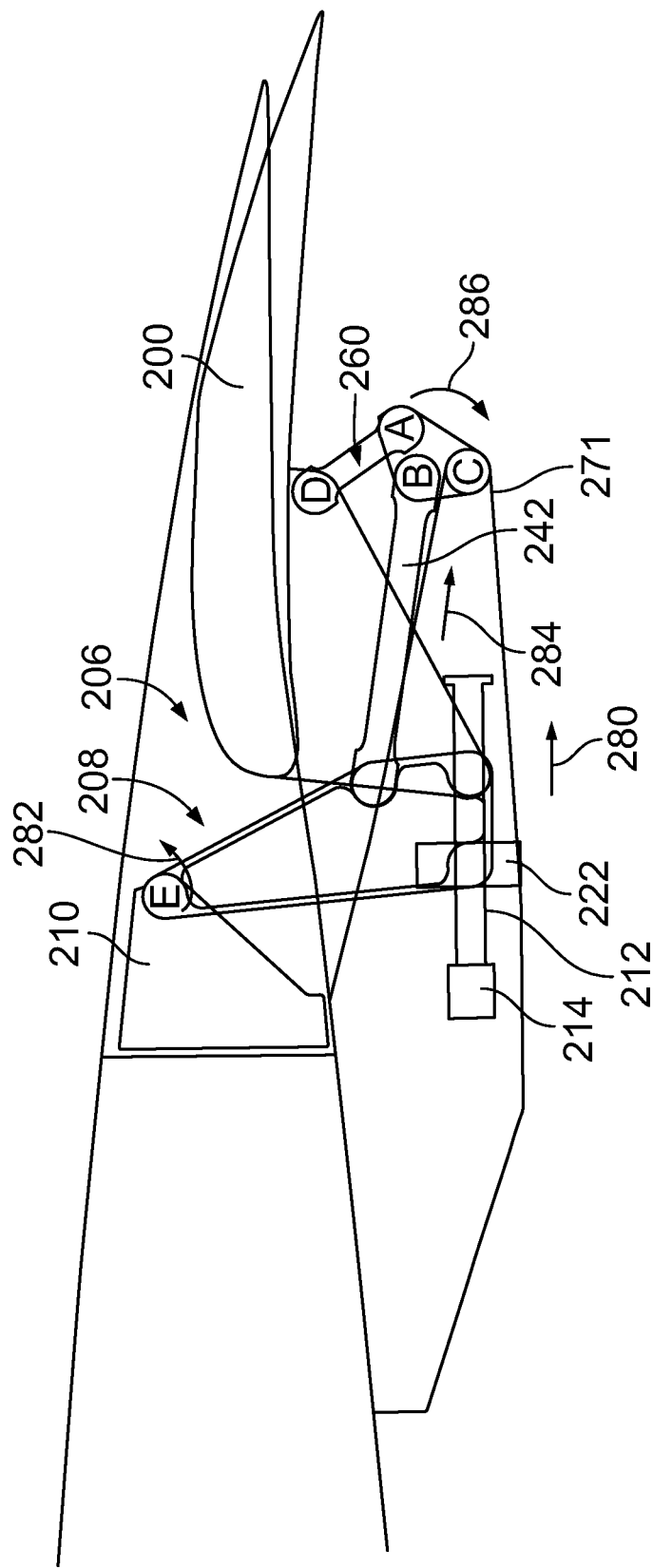
FIG. 4 illustrates a lateral view of the flap in a 25% deployed position, according to an example of the present disclosure.
Figure 5:
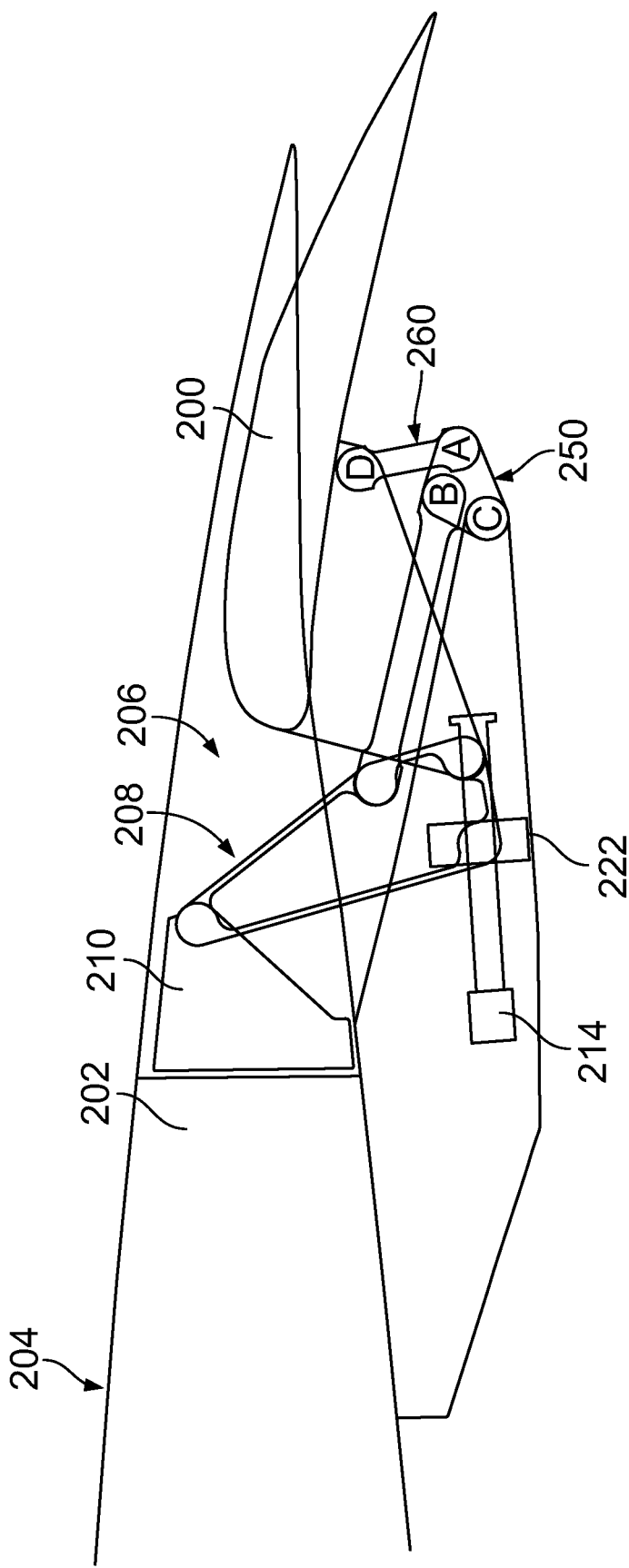
FIG. 5 illustrates a lateral view of the flap in a 50% deployed position, according to an example of the present disclosure.
Figure 6:
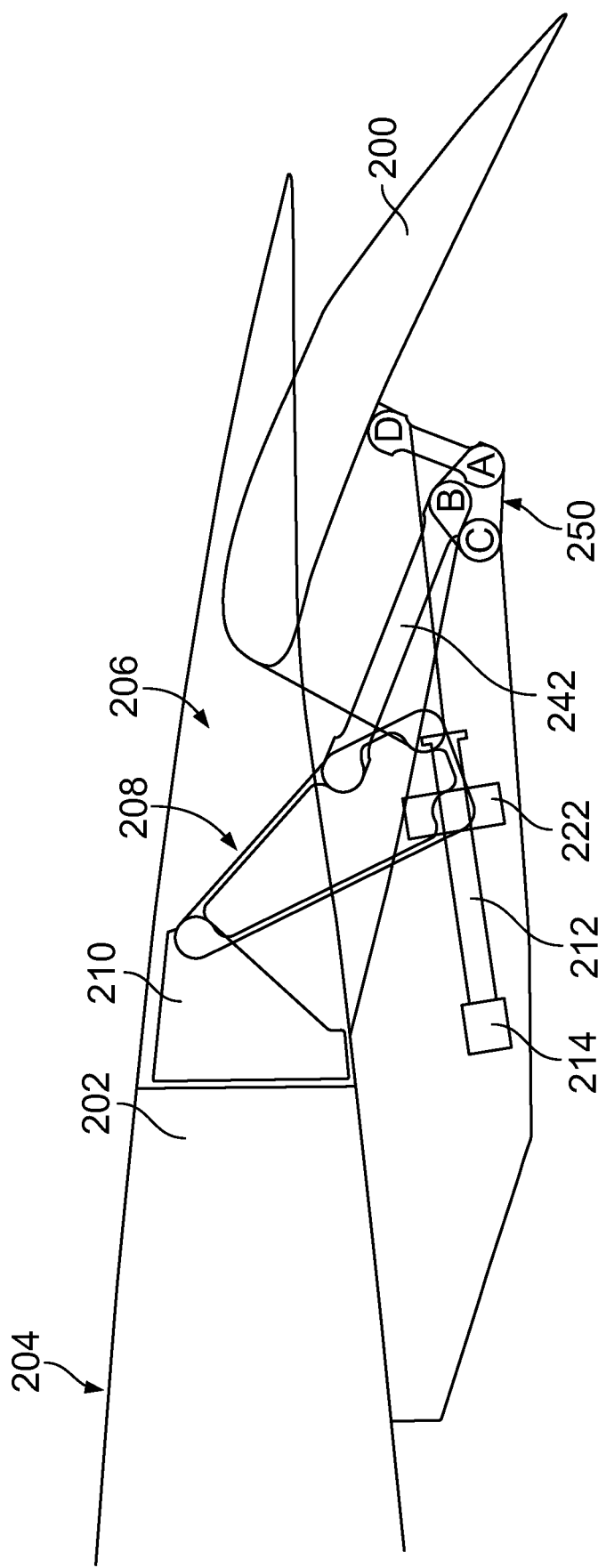
FIG. 6 illustrates a lateral view of the flap in a 75% deployed position, according to an example of the present disclosure.

FIG. 4 illustrates a lateral view of the flap 200 in a 25% deployed position, according to an example of the present disclosure. FIG. 5 illustrates a lateral view of the flap in a 50% deployed position, according to an example of the present disclosure. FIG. 6 illustrates a lateral view of the flap in a 75% deployed position, according to an example of the present disclosure. Referring to FIGS. 3-6, as the actuator 214 operates to rearwardly drive the carriage 222 along the shaft 212 in the direction of arrow 280, the crank 208 pivots about point E in the direction of arc 282 in relation to the bracket 210, thereby pushing the drive link 242 rearwardly in the direction of arrow 284, causing the rocker bracket 250 to downwardly rotate about point C in the direction of arc 286. Consequently, the rocker bracket 250 pivots downwardly at point A, thereby pulling the flap link 260 downwardly, which, in turn, causes the flap 200 to move downwardly in response.

Figure 7:
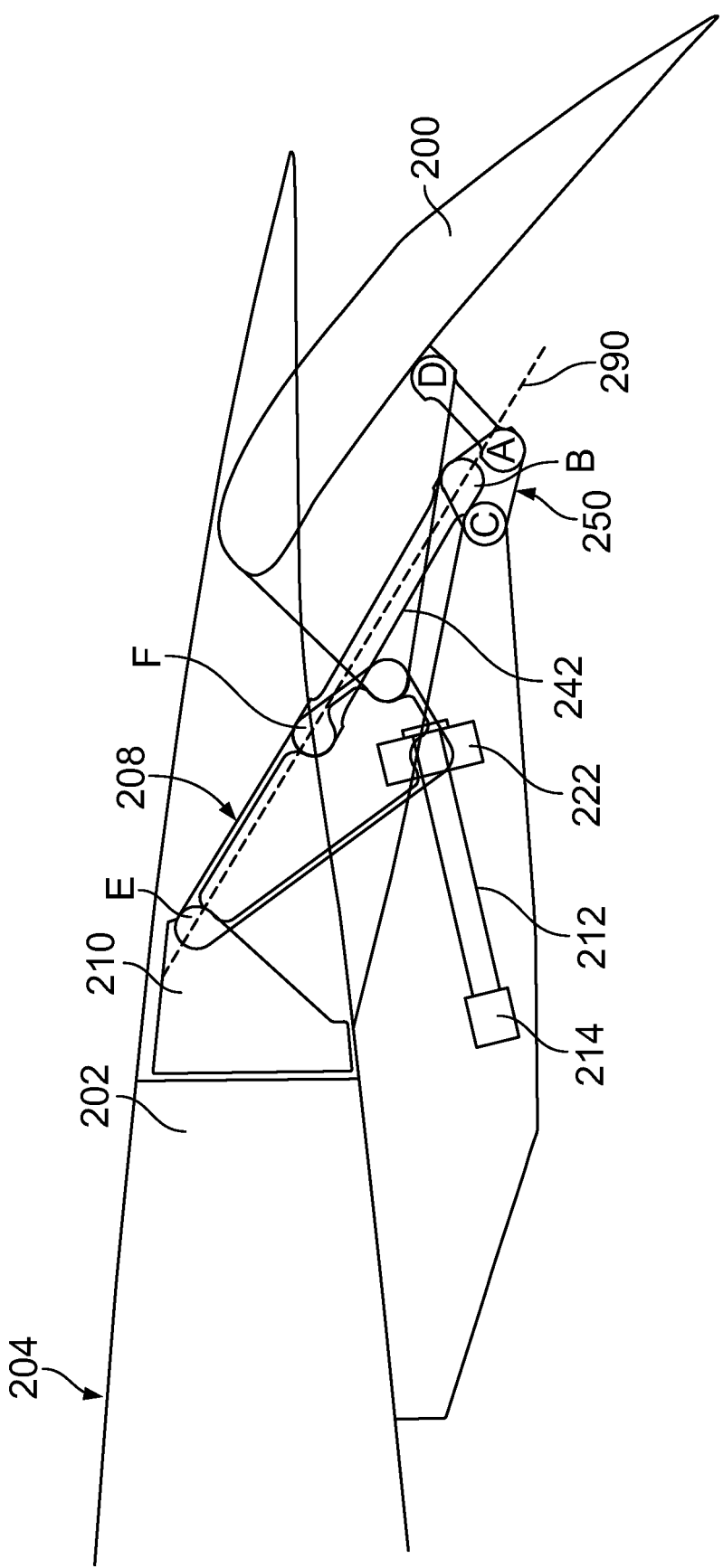
FIG. 7 illustrates a lateral view of the flap in a fully deployed position, according to an example of the present disclosure.

FIG. 7 illustrates a lateral view of the flap in a fully deployed position, according to an example of the present disclosure. As shown, in the fully deployed position, point E, where the crank pivotally couples to the bracket 210, point F, where the bracket pivotally couples to the drive link 242, and point B, wherein the drive link pivotally couples to the rocker bracket 250, are disposed along a line 290 that provides an over-center condition, which transfers loads from the flap 200 into the main body 204 of the wing 202, such as fixed underwing structure and spar structure, rather than into the actuator 214. Referring to FIGS. 3 and 7, the flap support system 206 provides a first over-center condition in the stowed position (points D-A-C along the line 274), and a second over-center condition in the fully deployed position (points E-F-B along line 290).

Referring to FIGS. 3-7, the flap 200 couples to the drive link 242 through the flap link 260, which pivotally connects to the rocker bracket 250. In contrast, prior known systems include a single unitary structure that connect the flap 200 to the drive link 242. That is, in prior known systems, there is no pivotal point A, which resulted in driving point C to a very low position to provide all desired positions between the stowed position and the fully deployed position. By breaking the single unitary link into the flap link 260 pivotally coupled to both the carrier beam 236, and the rocker bracket 250, which in turn pivotally couples to the drive link 242 and the trailing lower end 271 of the main body 202, point C can be pulled much higher toward the flap 200. The linking of pivot pins, hard point connections, and the like in the stowed and deployed positions along the lines 274 (shown in FIG. 3) and 290 (shown in FIG. 7) provides the over-center conditions. When such links are not aligned, moment (for example, torques) can increase loads. As such, the over-center conditions shown in FIGS. 3 and 7 reduce loads exerted into the flap support system 206, and, instead, transfer such loads into the fixed structure of the wing 204. Examples of the present disclosure provide the flap support system 206, which reduces actuator loads and power requirements at the stowed position and the fully deployed position, which also reduces structural weight, and does not increase complexity. The flap support system 206 increases kinematic accuracy compared to track-link design (and any monolithic aft-link design). The flap support system 206 provides a first over-center condition in the stowed position, and a second over-center condition in the fully deployed position.

As described herein, the flap support system 206 provides a first over-center condition when the flap 200 is in the stowed position (shown in FIG. 3). The flap support system 206 provides a second over-center condition when the flap is in the fully deployed position (shown in FIG. 7). A pivotal connection (point D), a pivotal connection (point A), and a pivotal connection (point D) are disposed along the line 274 to provide the first over-center condition. The crank 208 pivotally connects to the bracket 210 at a pivotal connection (point E). The crank 208 pivotally connects to the drive link 242 at a pivotal connection (point F). The pivotal connection E, the pivotal connection F, and the pivotal connection B are disposed along the line 290 to provide the second over-center condition.

Further, the disclosure comprises examples according to the following clauses:

Clause 1. A system comprising:
a crank pivotally coupled to a bracket of a main body of a wing of an aircraft;
a drive link pivotally coupled to the crank;
a flap link pivotally coupled to a carrier beam extending from a flap moveably coupled to the main body of the wing; and
a rocker bracket pivotally coupled to the flap link and the drive link.

Clause 2. The system of Clause 1, wherein the flap link pivotally connects to the carrier beam at a first pivotal connection, wherein the rocker bracket pivotally connects to the flap link at a second pivotal connection, wherein the rocker bracket pivotally connects to the drive link at a third pivotal connection, and wherein the rocker bracket pivotally connects to the main body of the wing at a fourth pivotal connection.

Clause 3. The system of Clause 2, wherein the system provides a first over-center condition when the flap is in a stowed position, and wherein the system provides a second over-center condition when the flap is in a fully deployed position.

Clause 4. The system of Clause 3, wherein the first pivotal connection, the second pivotal connection, and the fourth pivotal connection are disposed along a first line to provide the first over-center condition.

Clause 5. The system of Clause 4, wherein the crank pivotally connects to the bracket at a fifth pivotal connection, wherein the crank pivotally connects to the drive link at a sixth pivotal connection, and wherein the fifth pivotal connection, the sixth pivotal connection, and the third pivotal connection are disposed along a second line to provide the second over-center condition.

Clause 6. The system of any of Clauses 1-5, wherein the crank is coupled to a carriage that is configured to be moved in relation to a shaft.

Clause 7. The system of any of Clauses 1-6, wherein the rocker bracket is aft from the crank.

Clause 8. The system of any of Clauses 1-7, wherein the rocker bracket has a triangular shape.

Clause 9. An aircraft comprising:
a fuselage;
wings extending from the fuselage, wherein the wings include a main body, and a flap moveably coupled to the main body; and
a system comprising:
a crank pivotally coupled to a bracket of the main body;
a drive link pivotally coupled to the crank;
a flap link pivotally coupled to a carrier beam extending from the flap; and
a rocker bracket pivotally coupled to the flap link and the drive link.

Clause 10. The aircraft of Clause 9, wherein the flap link pivotally connects to the carrier beam at a first pivotal connection, wherein the rocker bracket pivotally connects to the flap link at a second pivotal connection, wherein the rocker bracket pivotally connects to the drive link at a third pivotal connection, and wherein the rocker bracket pivotally connects to the main body of the wing at a fourth pivotal connection.

Clause 11. The aircraft of Clause 10, wherein the system provides a first over-center condition when the flap is in a stowed position, and wherein the system provides a second over-center condition when the flap is in a fully deployed position.

Clause 12. The aircraft of Clause 11, wherein the first pivotal connection, the second pivotal connection, and the fourth pivotal connection are disposed along a first line to provide the first over-center condition.

Clause 13. The aircraft of Clause 12, wherein the crank pivotally connects to the bracket at a fifth pivotal connection, wherein the crank pivotally connects to the drive link at a sixth pivotal connection, and wherein the fifth pivotal connection, the sixth pivotal connection, and the third pivotal connection are disposed along a second line to provide the second over-center condition.

Clause 14. The aircraft of any of Clauses 9-13, wherein the crank is coupled to a carriage that is configured to be moved in relation to a shaft.

Clause 15. The aircraft of any of Clauses 9-14, wherein the rocker bracket is aft from the crank.

Clause 16. The aircraft of any of Clauses 9-15, wherein the rocker bracket has a triangular shape.

Clause 17. A method comprising:
pivotally coupling a crank to a bracket of a main body of a wing of an aircraft;
pivotally coupling a drive link to the crank;
pivotally coupling a flap link to a carrier beam extending from a flap moveably coupled to the main body of the wing; and
pivotally coupling a rocker bracket pivotally to the flap link and the drive link.

Clause 18. The method of Clause 17, wherein the flap link pivotally connects to the carrier beam at a first pivotal connection, wherein the rocker bracket pivotally connects to the flap link at a second pivotal connection, wherein the rocker bracket pivotally connects to the drive link at a third pivotal connection, wherein the rocker bracket pivotally connects to the main body of the wing at a fourth pivotal connection, wherein the system provides a first over-center condition when the flap is in a stowed position, wherein the system provides a second over-center condition when the flap is in a fully deployed position, wherein the first pivotal connection, the second pivotal connection, and the fourth pivotal connection are disposed along a first line to provide the first over-center condition, wherein the crank pivotally connects to the bracket at a fifth pivotal connection, wherein the crank pivotally connects to the drive link at a sixth pivotal connection, and wherein the fifth pivotal connection, the sixth pivotal connection, and the third pivotal connection are disposed along a second line to provide the second over-center condition.

Clause 19. The method of Clauses 17 or 18, further comprising coupling the crank to a carriage that is configured to be moved in relation to a shaft.

Clause 20. The method of any of Clauses 17-19, wherein the rocker bracket is aft from the crank, and wherein the rocker bracket has a triangular shape.

As described herein, examples of the present disclosure provide systems and methods for supporting a flap in relation to a wing that reduce actuation loads.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
an actuator;
a shaft coupled to the actuator;
a carriage configured to ride along the shaft;
a crank pivotally coupled to a bracket of a main body of a wing of an aircraft, the crank further coupled to the shaft, wherein the crank includes an extension beam having a first end pivotally coupled to the bracket, and a second end coupled to the carriage, wherein the first end of the extension beam connects to an angled beam that extends to a link beam that is parallel to the extension beam, and wherein the link beam connects to an end beam that connects to the second end of the extension beam;
a drive link pivotally coupled to the crank, wherein the drive link is pivotally coupled to the angled beam;
a flap link pivotally coupled to a carrier beam extending from a flap moveably coupled to the main body of the wing; and
a rocker bracket pivotally coupled to the flap link and the drive link.

2. The system of claim 1, wherein the flap link pivotally connects to the carrier beam at a first pivotal connection, wherein the rocker bracket pivotally connects to the flap link at a second pivotal connection, wherein the rocker bracket pivotally connects to the drive link at a third pivotal connection, and wherein the rocker bracket pivotally connects to the main body of the wing at a fourth pivotal connection.

3. The system of claim 2, wherein the system provides a first over-center condition when the flap is in a stowed position, and wherein the system provides a second over-center condition when the flap is in a fully deployed position.

4. The system of claim 3, wherein the first pivotal connection, the second pivotal connection, and the fourth pivotal connection are disposed along a first line to provide the first over-center condition.

5. The system of claim 4, wherein the crank pivotally connects to the bracket at a fifth pivotal connection, wherein the crank pivotally connects to the drive link at a sixth pivotal connection, and wherein the fifth pivotal connection, the sixth pivotal connection, and the third pivotal connection are disposed along a second line to provide the second over-center condition.

6. The system of claim 1, wherein the rocker bracket is aft from the crank.

7. The system of claim 1, wherein the rocker bracket has a triangular shape.

8. The system of claim 1, wherein a forward apex of the carrier beam connects to an aft end of the link beam.

9. An aircraft comprising:
a fuselage;
wings extending from the fuselage, wherein the wings include a main body, and a flap moveably coupled to the main body; and
a system comprising:
an actuator;
a shaft coupled to the actuator;
a carriage configured to ride along the shaft;
a crank pivotally coupled to a bracket of the main body, the crank further coupled to the shaft, wherein the crank includes an extension beam having a first end pivotally coupled to the bracket, and a second end coupled to the carriage, wherein the first end of the extension beam connects to an angled beam that extends to a link beam that is parallel to the extension beam, and wherein the link beam connects to an end beam that connects to the second end of the extension beam;
a drive link pivotally coupled to the crank, wherein the drive link is pivotally coupled to the angled beam;
a flap link pivotally coupled to a carrier beam extending from the flap; and
a rocker bracket pivotally coupled to the flap link and the drive link.

10. The aircraft of claim 9, wherein the flap link pivotally connects to the carrier beam at a first pivotal connection, wherein the rocker bracket pivotally connects to the flap link at a second pivotal connection, wherein the rocker bracket pivotally connects to the drive link at a third pivotal connection, and wherein the rocker bracket pivotally connects to the main body of the wing at a fourth pivotal connection.

11. The aircraft of claim 10, wherein the system provides a first over-center condition when the flap is in a stowed position, and wherein the system provides a second over-center condition when the flap is in a fully deployed position.

12. The aircraft of claim 11, wherein the first pivotal connection, the second pivotal connection, and the fourth pivotal connection are disposed along a first line to provide the first over-center condition.

13. The aircraft of claim 12, wherein the crank pivotally connects to the bracket at a fifth pivotal connection, wherein the crank pivotally connects to the drive link at a sixth pivotal connection, and wherein the fifth pivotal connection, the sixth pivotal connection, and the third pivotal connection are disposed along a second line to provide the second over-center condition.

14. The aircraft of claim 9, wherein the rocker bracket is aft from the crank.

15. The aircraft of claim 9, wherein the rocker bracket has a triangular shape.

16. The aircraft of claim 9, wherein a forward apex of the carrier beam connects to an aft end of the link beam.

17. A method comprising:
coupling a shaft to an actuator;
coupling a carriage to the shaft, wherein the carriage is configured to ride along the shaft;
pivotally coupling a crank to a bracket of a main body of a wing of an aircraft;
coupling the crank to the shaft;
pivotally coupling a drive link to the crank, wherein the crank includes an extension beam having a first end pivotally coupled to the bracket, and a second end coupled to the carriage, wherein the first end of the extension beam connects to an angled beam that extends to a link beam that is parallel to the extension beam, and wherein the link beam connects to an end beam that connects to the second end of the extension beam;
pivotally coupling a flap link to a carrier beam extending from a flap moveably coupled to the main body of the wing, wherein the drive link is pivotally coupled to the angled beam; and
pivotally coupling a rocker bracket pivotally to the flap link and the drive link.

18. The method of claim 17, wherein the flap link pivotally connects to the carrier beam at a first pivotal connection, wherein the rocker bracket pivotally connects to the flap link at a second pivotal connection, wherein the rocker bracket pivotally connects to the drive link at a third pivotal connection, wherein the rocker bracket pivotally connects to the main body of the wing at a fourth pivotal connection, wherein the system provides a first over-center condition when the flap is in a stowed position, wherein the system provides a second over-center condition when the flap is in a fully deployed position, wherein the first pivotal connection, the second pivotal connection, and the fourth pivotal connection are disposed along a first line to provide the first over-center condition, wherein the crank pivotally connects to the bracket at a fifth pivotal connection, wherein the crank pivotally connects to the drive link at a sixth pivotal connection, and wherein the fifth pivotal connection, the sixth pivotal connection, and the third pivotal connection are disposed along a second line to provide the second over-center condition.

19. The method of claim 17, wherein the rocker bracket is aft from the crank, and wherein the rocker bracket has a triangular shape.

20. The method of claim 17, wherein a forward apex of the carrier beam connects to an aft end of the link beam.

* * * * *